United States Patent [19]

Graziano

[11] 4,128,740
[45] Dec. 5, 1978

[54] ANTENNA ARRAY FOR A CELLULAR RF COMMUNICATIONS SYSTEM

[75] Inventor: Victor Graziano, Oak Park, Ill.

[73] Assignee: Motorola, Inc., Schaumburg, Ill.

[21] Appl. No.: 768,260

[22] Filed: Feb. 14, 1977

[51] Int. Cl.² .............................................. H04Q 7/04
[52] U.S. Cl. .................................. 179/2 EB; 325/55; 325/64
[58] Field of Search ............ 179/2 EB, 2 EA, 15 BZ; 325/51, 52, 53, 55, 64

[56] References Cited

U.S. PATENT DOCUMENTS

| | | | |
|---|---|---|---|
| 3,582,787 | 6/1971 | Muller et al. | 325/53 |
| 3,663,762 | 5/1972 | Joel, Jr. | 325/51 |
| 3,819,872 | 6/1974 | Hamrick | 325/55 |
| 3,898,390 | 8/1975 | Wells et al. | 325/55 |
| 3,906,166 | 9/1975 | Cooper et al. | 325/55 |
| 3,913,017 | 10/1975 | Imaseki | 343/200 |

FOREIGN PATENT DOCUMENTS 1472211  5/1977  United Kingdom .................. 179/2 EB Primary Examiner—Kathleen H. Claffy
Assistant Examiner—Gerald L. Brigance
Attorney, Agent, or Firm—James W. Gillman; Sang Ki Lee

[57] ABSTRACT

An array of antennas for a cellular RF communications system for providing communications to randomly placed transceivers in a given area. The antenna array includes a plurality of antenna sites located in the centers of cells. Each antenna site has a plurality of sectored antennas for providing a plurality of communication channels. A predetermined number of sites are used to constitute a subarray of cells to provide a set of communication channels and channel allocations are repeated from subarray to subarray. Channels are also so allocated as to minimize channel interference and optimize channel utilization. An omnidirectional antenna may be provided for each antenna site for signalling purposes.

13 Claims, 9 Drawing Figures

CENTER ILLUMINATED SECTOR CELL SYSTEM

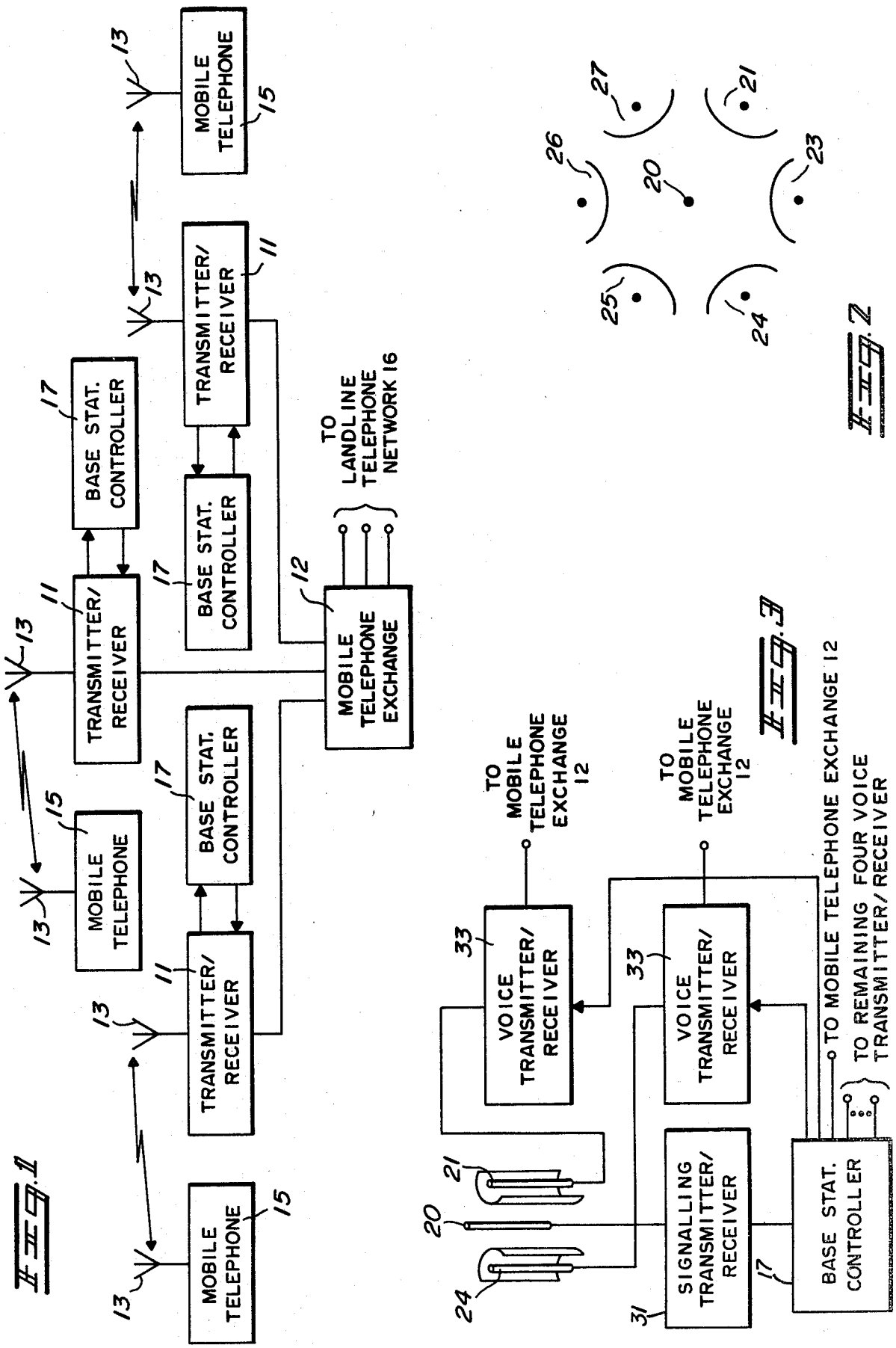

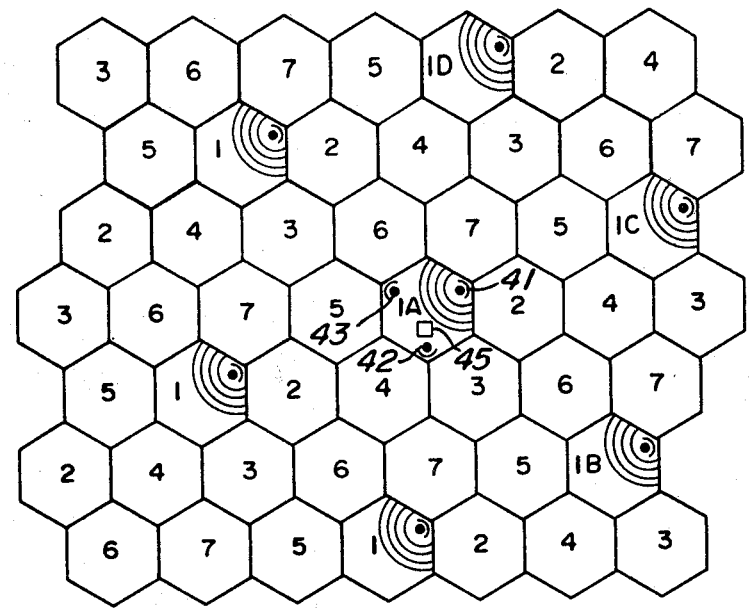
PRIOR ART  CORNER ILLUMINATED CELL SYSTEM
FIG. 4
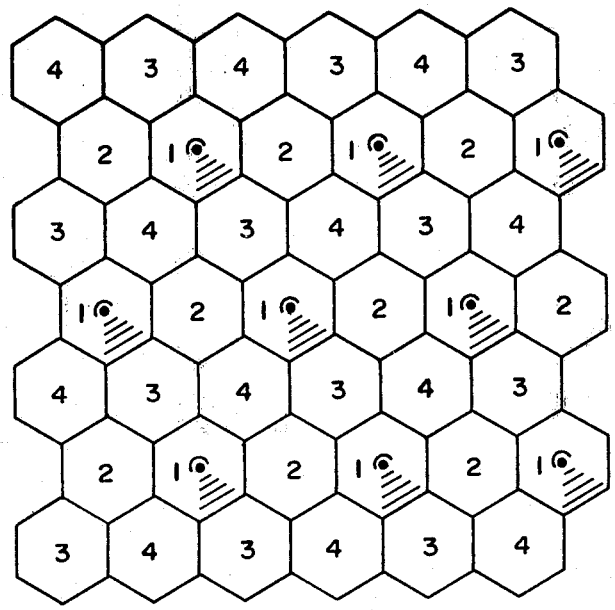
FIG. 5  CENTER ILLUMINATED SECTOR CELL SYSTEM

CELL SYSTEM FREQUENCY PLAN FOR USE WITH SECTORS

SECTOR ASSIGNMENTS IN W X Y Z CELLS
MAKING UP A SUBARRAY

ANTENNA ARRAY FOR A CELLULAR RF COMMUNICATIONS SYSTEM

FIELD OF THE INVENTION

This invention relates to antennas in general and more particularly, to an antenna array for a cellular RF communications system.

BACKGROUND OF THE INVENTION

Modern communications systems utilizing channel allocation of the higher frequency spectrum now made available by the Federal Communications Commission have set in motion a search for a portable or mobile RF telecommunications systems of even greater capacity to meet the ever increasing demand. To meet the need, extensive efforts are made to develop mobile or portable RF telephone network to be linked with landline telephone networks to increase communications capabilities at large. In response there has been proposed a cellular RF communications systems wherein a central concept is based on the so-called corner illuminated cellular array. According to this proposal, antenna sites are disposed at predetermined corners of cells for illuminating each of the cells inwardly from the corner. It has been found that while such cellular system is feasible in providing communications, it is susceptible to certain shortcomings and disadvantages due to co-channel and adjacent channel interferences. It is also found that such a cellular system requires an excessive number of antenna sites for providing a given number of communication channels in a given area.

SUMMARY OF THE INVENTION

It is an object of this invention to minimize the number of antenna sites in an RF communications system for a given number of channels in a given area.

It is another object of the present invention to arrange antenna sites and operate them in such a way that there are minimum co-channel and adjacent channel interferences.

It is still another object of the present invention to have the RF communications system flexible so that where necessary, more channels can be made available in a given area.

It is yet another object of the present invention to provide an improved antenna array for a cellular RF communications system.

The foregoing and other objects of the present invention are accomplished in accordance with the present invention by providing antenna sites substantially at the centers of the cells of the cellular array of the RF communications systems, providing a plurality of antennas for each of the sites for illuminating the cells in sectors from the center thereof, forming a number of cells into a subarray and allocating channels for the antennas in the subarray and repeating the channel allocations from subarray to subarray so as to minimize co-channel and adjacent channel interferences.

The foregoing and other features of the present invention will be made clearer and more fully apprehended from the detailed description of the illustrative embodiments of the present invention hereinbelow in conjunction with the accompanying drawings.

BRIEF DESCRIPTION OF THE DRAWINGS

FIG. 1 shows a functional block diagram of mobile or portable telephones and associated base station transceivers and antennas of an RF telecommunications system.

FIG. 2 shows a cross sectional view of sector antennas and an omni antenna that may be associated with an antenna site.

FIG. 3 shows a base station for an antenna site in a functional block diagram.

FIG. 4 shows a graphical view of a corner illuminated cellular RF communications system according to the prior art.

FIG. 5 shows a graphical view of a center illuminated cellular RF communications system in accordance with the present invention.

FIG. 6 shows spatial relationship of desired and interferring channels.

FIG. 7 shows a simplified view of propagation geometry of desired and interferring channels in the presence of an obstruction.

DETAILED DESCRIPTION OF THE PREFERRED EMBODIMENT

Figure 9:
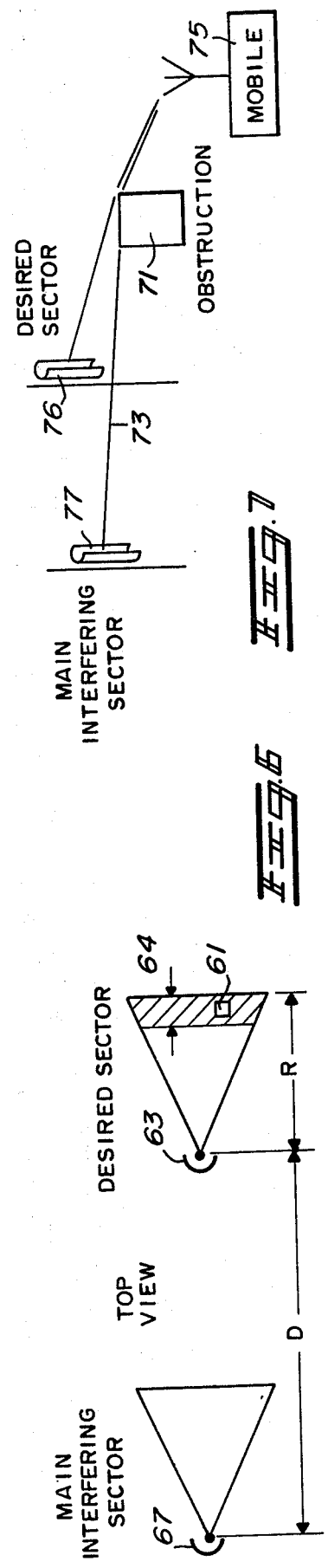
FIG. 9 shows in a tabular form channel allocations in a subarray of the center illuminated antenna array.

FIG. 1 illustrates, in a functional block diagram form, an illustrative example of an RF communications system. The system may include a plurality of transceivers 11 under the control of a mobile telephone exchange MTX 12. The mobile exchange is in turn connected to a landline telephone exchange 16 for landline telephone subscribers. The system also includes antennas 13 coupled to corresponding transceivers 11 and mobile or portable radio telephones 15. (Hereinafter, the terms mobile radio telephones or portable radio telephones or mobile transceivers will be used as synonomous terms.) The interconnection between the subscribers to the landline telephone exchange and the mobile radio telephones are facilitated by mobile telephone exchange MTX 12.

FIG. 2 illustrates a cross-sectional view of an antenna site that may be used in the array of antennas in accordance with the present invention. The antenna site may include an omnidirectional antenna 20 for signalling purposes. A plurality of sector antennas, for example, six antenna sectors 21 through 27 are used to provide voice channel communications. As illustrated in FIG. 3, the omnidirectional antenna 20 is coupled to the signalling transceiver 31 and the sector antennas are coupled to voice transceivers 33. Both the signalling and voice transceivers are coupled to and under the control of base station controller 35. The voice transceivers and the base controller are coupled to a mobile telephone exchange MTX 12 for linking a network of mobile telephones to a network of landline subscribers coupled to the landline telephone exchange.

A cellular RF mobile telecommunications system may typically include a plurality of antenna sites or stations of the type described hereinabove with reference to FIGS. 2 and 3. One of the main concerns in the cellular mobile telecommunications art has been to maximize the utilization of channels allocated for the system. Another concern has been to find ways to reduce channel interferences in the system.

FIG. 4 shows a geographical view of a corner illuminated cellular RF communications system that illustrates an example of the manner in which channels have been utilized, according to a prior art that has been proposed. According to the proposal, a given area in which a cellular mobile telecommunications service is to be provided is organized into hexagonal cells, and antennas 41, 42, 43 are provided at every alternate corners to illuminate a given cell 1A. In this manner, three corner antennas are used to illuminate a given cell. In this way, three different channels may be provided by the three antennas for the given cell, assuming that each antenna provides a channel.

According to the prior art, it is also suggested that channel assignments may be repeated for every given number of cells, or subarray. In the suggested corner illuminated system, 120° angle of illuminations are provided by each antenna. Because of this relatively large illumination angle, a mobile telephone in a cell unit can be exposed to as many as three different interferring signals from co-channels, as illustrated in FIG. 4. For example, a mobile unit 45 in cell 1A is exposed to the interferring signals coming from the co-channels in cell 1B, 1C and 1D.

How well a cellular RF communications system utilizes channels allocated for the system depends upon various diverse factors such as the quality of the mobile transceivers, the topology, the structures in the area that is serviced by the system, etc. A criteria for measuring the quality and channel utilization of an RF communications system is the carrier to interference performance that is deemed acceptable by 75% of the users in 90% of the mobile units in the system. Measured in terms of this criteria, the suggested 120° corner illumination cellular system is found to require at least seven cells per subarray for satisfactory performance. Stated in other words, the suggested corner illumination cellular array system requires seven cells per subarray before the signal channel allocations can be repeated. This is illustrated by the numbering of the cells 1 through 7 with similar numbers in FIG. 4.

In accordance with the present invention, antenna sites are located substantially in the centers of the cells of the cellular RF communications system, as illustrated in FIG. 5. Associated with each antenna site, there is provided an omnidirectional antenna 20 (FIG. 2, OMNI) and six sector antennas (FIG. 2; 21–27) for voice channels for illuminating 60° beams outwardly, thereby providing full 360° illumination. In accordance with one aspect of the present invention, each of the sectors are allocated one or more communications channels and a given number of cells are used to form a subarray for providing a predetermined number of communications channels. The communication channel allocations are repeated from subarray to subarray. The center illuminated cell arrangement is shown to require lesser number of cells in forming a subarray and consequently lesser number of antenna sites for providing a given number of channels in a given area. Measured in terms of the carrier to interference performance considered acceptable in the manner stated hereinabove, it was found that, given the same cell size, the present arrangement increased the number of channels per given area over the corner illuminated system.

It is found that, as shown in FIG. 5, with the numbering of the cells 1 through 4, with similar numbers indicating co-channel utilization, only four cells are needed to form a subarray. This is in contrast to the seven cells subarray required by the corner illuminated system. This reduction in the cell number per subarray is obtained while maintaining at the same lever the carrier to interference performance considered acceptable for both the prior art corner illuminated cellular system and the center illuminated cellular system of the present invention. This enhancement in terms of reduced cell size of subarray is obtained by the fact that a mobile unit in a given cell for a given channel in a center illuminated cell system is subjected to only one co-channel interfering signal uninhibited by antenna beam restrictions. This is as opposed to three co-channel interferring signals in the corner illuminated system as stated before.

The aforementioned advantages gained by the present center illuminated cellular system are graphically illustrated in FIGS. 6 and 7. Referring to FIGS. 6 and 7, the advantages found in the application of the present invention may be explained as follows. In FIG. 6, for instance, it can be seen that a mobile telephone 61 operating in the limit region of a desired sector is a distance R from its desired sector antenna 63 and a distance D + R from another antenna 67 that provides the strongest co-channel interferring signal. The carrier to interference ratio being a function of the ratio D + R/R is therefore the maximum available. If any other sector at the desired site had been chosen, the interference would be greater, because the distance to the interferring antenna would be less than D + R, while the distance to the desired site in the limit region would still be R.

In FIG. 7, a side view of representative propagation paths 71 and 73 to a mobile 75 from a desired sector antenna 76 and the main interferring sector antenna 77 are shown. These paths are seldom, if at all, clear line of sight paths in actual field conditions. They are basically obstruction limited. From the geometry of the path, it is obvious that the most likely obstruction shadowing will occur in the region within the desired sector. Under such conditions, both the desired and undesired signals tend to suffer similar attenuation losses due to the obstruction. This tendency to correlate at least in mean value between desired signal attenuation and interferring signal attenuation reduces the effects of interference by reducing number of mobiles subjected to excessive interferences where interference is relatively strong and desired signal is relatively weak.

Figure 8:
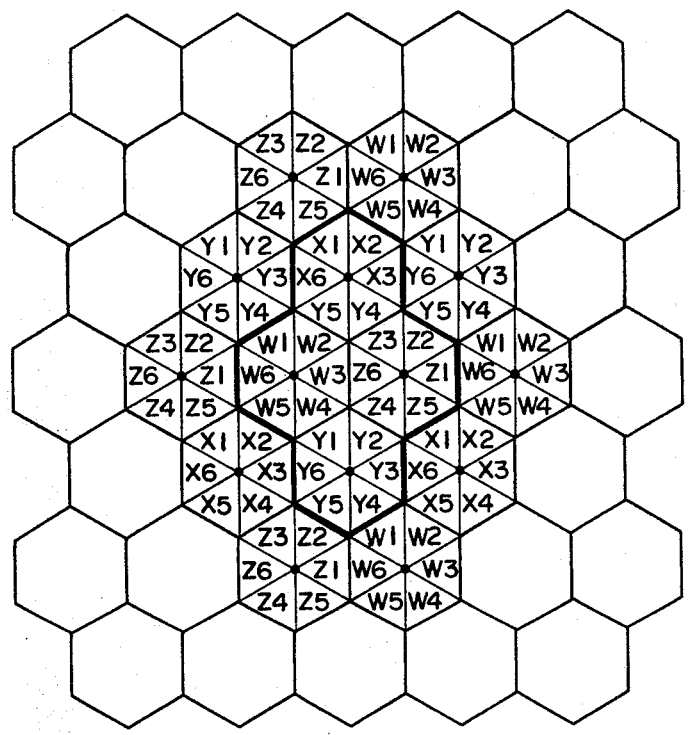
FIG. 8 shows a graphical view of the center illuminated cellular system arranged in a subarray, each array having a given number of cells wherein channel allocations are repeated from subarray to subarray.

Still another inventive aspect of the present system is illustrated in FIG. 8 in terms of unique channel allocation that minimizes adjacent channel interferences. For example, for a given subarray of four cells with each cell having six sectors, the frequencies are allocated as follows. For a given number of cells of the subarray, (e.g., cells X, Y and W), the frequencies for the sectors of each of the X, Y, W cells are allocated in an ascending order in a clockwise direction. The remaining cell Z of the subarray, however, has channel allocations which are different. Thus, for example, in the case of the channels for each of the six sectors of the Z cell, channels may be allocated in a descending order in a clockwise direction and furthermore, two or more pairs of the sectors (e.g., Z1 and Z3) may be transposed, that is, the frequency allocated for the two sectors may be transposed. In the foregoing manner, adjacent channel interferences are further minimized for the cells and for the subarray.

The array of antennas of a cellular RF communications system may be grouped into subarrays in the manner as described hereinabove and the channels may be allocated in the aforedescribed manner for the sections of the four cells subarrays and the channel allocations may be repeated from subarray to subarray.

FIG. 9 illustrates a specific example of frequency allocation plan for the four cell subarray in accordance with the present invention. Referring to FIG. 9 more specifically, 24 channels, S1 through S24, designated as layer S, are set aside for signalling purposes. It is of course to be understood that instead of 24, only 10 or 21 or any other suitable number of channels may be used for signalling purposes. Layers of channels A, B, C, D, E, F, G, and H are shown to illustrate the face many layers of channels may be allocated for voice communications. Since the four cell subarray of the present system includes 24 sectors, 24 channels sets CS1 through CS24 are provided for the sectors W1, X1 ... Y6, Z6.

As illustrated in FIG. 9, multiple layers of channels may be allocated to the 24 sectors contained in a subarray. The allocation of the first layer A, thus, entail channels 25, 26, 27, ... 48, for sectors W1, X1, Y1 ... Z6 respectively. For the second layer B, channels 49, 50, 51 ... 72 are allocated to sectors W1, X1, Y1 ... Z6 and so on. This may be repeated for any given number of layers C, D, ... and so on as required. As shown, channel allocation for layer H is incomplete to reflect limitation that may be imposed by regulatory authorities.

Closer examination of the frequency allocation in FIG. 9 will show that channels are assigned to avoid adjacent channel interferences. Thus, with reference to sector X1, X2, and X3 of cell X of a subarray in FIG. 8, channels 26, 20, 34 are assigned as indicated in layer A in FIG. 9. This provides necessary adjacent channel separation among sectors X1, X2 and X3 of cell X. Adjacent sectors X5, W2, X4, W3 are given the requisite separation in that they are respectively assigned channels 42, 29, 38, 33.

More generally, adjacent channel separation is obtained for all of the sectors of the cells X, Y and W by allocating channels in increasing order in clockwise direction of the sectors X, Y and W cells of the subarray. This pattern is broken up when it comes to allocating channels for sectors of the cell Z. This can be seen from the following. Suppose sector Z1 were located in the upper left in place of Z3 as presently shown in FIG. 8. Then it will have channel allocation of 28 of layer A. Now this channel 28 is adjacent to channel 29 allocated to sector W2 of cell W previously assigned. By transposing Z3 and Z1 sectors, the adjacent channel interference is minimized in that now channel 36 of layer A is assigned for sector 23 next to channel 29 assigned to sector W2. In the foregoing manner, various channels are allocated to various sectors of cells making a given subarray and that minimizes adjacent channels interferences and such allocations may be repeated from subarray to subarray.

Hereinabove, an illustrative embodiment of an inventive array of antennas for a cellular RF telecommunications system configuration has been described that provides maximum utilization of channels that may be allocated for a given area with minimum co-channel and adjacent channel interferences. Various other changes and modifications may be made by one of ordinary skill without departing from the spirit and scope of the present invention and within the ambit of the principles of the present invention described hereinabove. Thus, while the present invention has been described in the context of antenna sites, each site having an omnidirectional antenna for signalling purposes and six sector antennas for voice communications purposes, clearly the underlying principles of the center illuminated cellular RF communications system of the present invention need not be so limited. For example, the same inventive principles can be applied in a cellular RF communications system that use sector antennas for signalling purposes or that does not have all of the antenna sectors in given antenna sites.

What I claim is:

1. A cellular RF Communications System for a plurality of mobile transceivers in a given geographical area of a cellular communications system, the system comprising:

an array of antennas made of a plurality of subarrays, each subarray having a number of cells, a plurality of sector antennas located substantially at the center of each cell, means for operating each of the sector antennas of cells of each subarray to provide a predetermined communication channel to the mobile transceivers which is different from that provided by the other sector antennas of the same cell, and means for repeating channel allocations to sector antennas for subarray to subarray in a predetermined pattern, means for positioning co-channel antennas with respect to one another so as to eliminate substantially side lobe and frontal lobe interferences from adjacent side and front co-channel sector antennas, and means for physically spacing and spatially relating co-channel antennas so as to minimize frontal lobe interference from the back co-channel.

2. The system according to claim 1, wherein co-channel sector antennas are positioned so that a given sector antenna is subjected to only one co-channel interfering signal uninhibited by antenna beam restrictions wherein said one co-channel is selected so that its interference is minimal.

3. The system according to claim 2, comprising:

said subarray made of a predetermined number of cells and each cell having a predetermined number of sector antennas.

4. The system according to claim 2, including means for operating each of the sector antennas to provide a plurality of communication channels.

5. The system according to claim 2, wherein certain of cells include six sector antennas, each for providing six sections of illumination of about 60° each.

6. The system according to claim 2, wherein four cells are used to form a subarray.

7. The antenna array according to claim 3, wherein two or more of sector antennas are allocated channels in a given sequence in a given subarray and the remaining antennas of the same subarray are allocated channels in a different sequence.

8. The antenna array according to claim 2, including an omnidirectional antenna in each cell for providing a signalling channel.

9. A method of providing communications channels to a plurality of mobile transceivers in a given area serviced by a cellular RF telecommunication system, the communications system having a plurality of antennas arranged in an array made of subarrays, each subarray having a plurality of cells, each cell provided with a centrally located antenna site, each site having a plurality of sector antennas, comprising the steps of:

operating the plurality of sector antennas of each array to provide different communications channels.

repeating channel allocations from subarray to subarray to increase utilization of channels available for the given area, allocating communications channels among the sector antennas so as to eliminate substantially side lobe and frontal lobe interferences from adjacent side and front co-channel sector antennas, and positioning co-channel antennas so that they are physically spaced and spatially related to one another so as to minimize frontal lobe interference from a back co-channel.

10. The method according to claim 9, including the step of positioning co-channel sector antennas so that a given sector antenna is subjected to only one co-channel interfering signal uninhibited by antenna beam restrictions wherein said one co-channel is selected so that its interference is minimal.

11. The method according to claim 9, including the steps of allocating channels for sector antennas in a given pattern for a given sequence and allocating channels in a different sequence in the same subarray.

12. The method according to claim 9, including the step of operating individual sector antennas to provide multiple communication channels.

13. The method according to claim 9, including the step of providing an onmidirectional antenna for each of the cells for providing a signalling channel.

* * * * *